US011544655B2

(12) United States Patent
Bastide et al.

(10) Patent No.: US 11,544,655 B2
(45) Date of Patent: Jan. 3, 2023

(54) TEAM EFFECTIVENESS ASSESSMENT AND ENHANCEMENT

(71) Applicant: INTERNATIONAL BUSINESS MACHINES CORPORATION, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 16/532,529

(22) Filed: Aug. 6, 2019

(65) Prior Publication Data
US 2021/0042677 A1 Feb. 11, 2021

(51) Int. Cl.
G06Q 10/00 (2012.01)
G06Q 10/06 (2012.01)
G06F 16/215 (2019.01)
G06F 16/28 (2019.01)
G06F 40/30 (2020.01)
G06F 40/295 (2020.01)

(52) U.S. Cl.
CPC ..... G06Q 10/06393 (2013.01); G06F 16/215 (2019.01); G06F 16/288 (2019.01); G06F 40/295 (2020.01); G06F 40/30 (2020.01)

(58) Field of Classification Search
None
See application file for complete search history.

(56) References Cited

U.S. PATENT DOCUMENTS

| 6,473,794 B1 * | 10/2002 | Guheen | H04L 43/50 |
| | | | 709/224 |
| 7,110,988 B1 | 9/2006 | Allemann | |
| 7,143,091 B2 * | 11/2006 | Charnock | G06Q 10/10 |
| | | | 707/999.005 |
| 7,512,612 B1 * | 3/2009 | Akella | G06F 16/9024 |

(Continued)

OTHER PUBLICATIONS

Rinker, T. W. (2017). Graphical discourse analysis: Data visualization as a tool for analyzing classroom discourse (Order No. 10276812). Available from ProQuest Dissertations and Theses Professional. (Year: 2017).*

(Continued)

*Primary Examiner* — Gurkanwaljit Singh
(74) *Attorney, Agent, or Firm* — L. Jeffrey Kelly

(57) ABSTRACT

A computer-implemented method for evaluating team effectiveness and acting on one or more outliers based on the evaluated team effectiveness. The method retrieves electronic data of one or more users, wherein the electronic data comprises a plurality of electronic communications. The method further extracts one or more concepts and metadata from the retrieved electronic data. The method further determines one or more outliers based on the extracted one or more concepts and metadata, wherein the determined one or more outliers are based on one or more poorly connected concepts and one or more poorly connected users. The (Continued)

method further acts on the determined one or more outliers and displays a report based on the determined one or more outliers.

15 Claims, 5 Drawing Sheets

(56) References Cited

U.S. PATENT DOCUMENTS

| | | | | |
|---|---|---|---|---|
| 8,200,527 | B1* | 6/2012 | Thompson | G06Q 30/00 705/7.41 |
| 8,301,489 | B2 | 10/2012 | Parry | |
| 10,007,721 | B1 | 6/2018 | Klein | |
| 10,096,033 | B2* | 10/2018 | Heath | G06Q 30/02 |
| 10,116,679 | B1* | 10/2018 | Wu | H04L 43/12 |
| 10,192,180 | B2* | 1/2019 | Prabhakara | G06Q 10/0631 |
| 10,462,196 | B2* | 10/2019 | Kalanithi | G06F 3/038 |
| 2006/0253418 | A1* | 11/2006 | Charnock | G06F 16/38 |
| 2008/0312980 | A1 | 12/2008 | Boulineau | |
| 2012/0179752 | A1* | 7/2012 | Mosley | H04L 65/403 709/204 |
| 2012/0296991 | A1* | 11/2012 | Spivack | H04L 51/52 709/206 |
| 2014/0129331 | A1* | 5/2014 | Spivack | G06Q 30/0255 705/14.53 |
| 2015/0012339 | A1* | 1/2015 | Onischuk | G07C 13/00 235/386 |
| 2015/0081725 | A1 | 3/2015 | Ogawa | |
| 2016/0012465 | A1* | 1/2016 | Sharp | G06Q 20/321 705/14.17 |
| 2018/0181626 | A1 | 6/2018 | Lyons | |
| 2018/0365626 | A1* | 12/2018 | Mansour | G06Q 10/063118 |

OTHER PUBLICATIONS

"Using targeted Bayesian network learning for suspect identification in communication networks" Gruber, A; Ben-Gal, I. International Journal of Information Security 17.2: 169-181. Heidelberg: Springer Nature B.V. (Apr. 2018) (Year: 2018).*

Porter, G. M. (2008). Improving distributed application reliability with end-to-end datapath tracing (Order No. 3331745). Available from ProQuest Dissertations and Theses Professional. (304697411). Retrieved from https://dialog.proquest.com/professional/docview/304697411?accountid=131444 (Year: 2008).*

De Choudhury, M. (2011). Analyzing the dynamics of communication in online social networks (Order No. 3452828). Available from ProQuest Dissertations and Theses Professional. (865845479). Retrieved from https://dialog.proquest.com/professional/docview/865845479?accountid=131444 (Year: 2011).* https://www.smartsheet.com/all-about-team-assessments, "Everything You Need to Know about Team Assessments", printed Jul. 3, 2019, pp. 1-26.

Mell et al., "The NIST Definition of Cloud Computing", National Institute of Standards and Technology, Special Publication 800-145, Sep. 2011, pp. 1-7.

Shrm, "Developing and Sustaining High-Performance Work Teams", https://www.shrm.org/resourcesandtools/tools-and-samples/toolkits/page . . . , printed Jul. 3, 2019, pp. 1-9.

Spark, "GraphX Programming Guide", https://spark.apache.org/docs/latest/graphx-programming-guide.html, printed Jul. 3, 2019, pp. 1-24.

UOPX News, "University of Phoenix Survey Reveals Nearly Seven-in-Ten Workers Have Been Part of Dysfunctional Teams", hppt://www.phoenix.edu/, Jan. 16, 2013, pp. 1-4.

* cited by examiner

TEAM EFFECTIVENESS ASSESSMENT AND ENHANCEMENT

BACKGROUND

The present invention relates generally to the field of data processing and more particularly to management efficiency assessment systems.

A company, an organization, or an entity comprises multiple teams working toward accomplishing a common business goal. A team is a primary unit of workers to resolve problems and to achieve business goals. Currently, teams may comprise of members with different professional trainings, members located at different geographic locations, members with different personal backgrounds, and members with different native languages. Moreover, digitization further expanded how teams communicate. Teams shifted from mere face to face verbal communications to sending and receiving digital communications using multiple electrical communication services.

SUMMARY

Embodiments of the present invention disclose a method, a computer program product, and a system.

According to an embodiment, a method, in a data processing system including a processor and a memory, for implementing a program. The method retrieves electronic data of one or more users, wherein the electronic data comprises a plurality of electronic communications. The method further extracts one or more concepts and metadata from the retrieved electronic data. The method further determines one or more outliers based on the extracted one or more concepts and metadata, wherein the determined one or more outliers are based on one or more poorly connected concepts and one or more poorly connected users. The method further acts on the determined one or more outliers and displays a report based on the determined one or more outliers.

According to another embodiment, a computer program product for directing a computer processor to implement a program. The storage device embodies program code that is executable by a processor of a computer to perform a method. The method retrieves electronic data of one or more users, wherein the electronic data comprises a plurality of electronic communications. The method further extracts one or more concepts and metadata from the retrieved electronic data. The method further determines one or more outliers based on the extracted one or more concepts and metadata, wherein the determined one or more outliers are based on one or more poorly connected concepts and one or more poorly connected users. The method further acts on the determined one or more outliers and displays a report based on the determined one or more outliers.

According to another embodiment, a system for implementing a program that manages a device, includes one or more computer devices each having one or more processors and one or more tangible storage devices. The one or more storage devices embody a program. The program has a set of program instructions for execution by the one or more processors. The method retrieves electronic data of one or more users, wherein the electronic data comprises a plurality of electronic communications. The method further extracts one or more concepts and metadata from the retrieved electronic data. The method further determines one or more outliers based on the extracted one or more concepts and metadata, wherein the determined one or more outliers are based on one or more poorly connected concepts and one or more poorly connected users. The method further acts on the determined one or more outliers and displays a report based on the determined one or more outliers.

DETAILED DESCRIPTION

Determining and resolving a problem is a primary foundation of modern economy. A company, an organization, or an entity comprises multiple teams working toward accomplishing a common business goal. A team is a primary unit of workers, businesses, and other entities who have been traditionally relied upon, and currently relied upon, to determine and resolve problems. A team may comprise a manager, who is responsible for allocating tasks and monitoring each member of the team to make sure they are working toward the team's goal and working collaboratively with other team members. Traditional teams are comprised of members within the similar geographic locations, members with similar personal backgrounds, and sometimes members within the same department. In contrast, current teams are more diverse than traditional teams, comprising members with different professional trainings, members at different geographic locations, members with different backgrounds, and members with different native languages. Moreover, digitization further expanded on how current team members communicate. In contrast to traditional face to face verbal communications, current teams not only communicate verbally through a video/voice conference call but may also communicate through multiple electrical communication services such as electronic mails ("emails") and messengers.

However, current team systems are limited because the manager is unable to effectively monitor the team members and determine which communications are effective, or ineffective. The manager is unable to effectively monitor the communications of the team members because there are too many communications amongst team members. Additionally, the manager is unable to determine which communications are effective, or ineffective, because there is no relevant information on the team's efficiency and how to make the team more effective and efficient.

The present invention resolves a sample limitation described above by providing relevant information to the manager through retrieving team's electrical communications, extracting concepts and metadata, determining outliers and providing a list of actions to improve a team's effectiveness by acting on the determined outliers.

Hereinafter, exemplary embodiments of the present invention will be described in detail with reference to the attached drawings.

The present invention is not limited to the exemplary embodiments below but may be implemented with the various modifications within the scope of the present invention. In addition, the drawings used herein are for purposes of illustration, and may not show actual dimensions.

Figure 1:
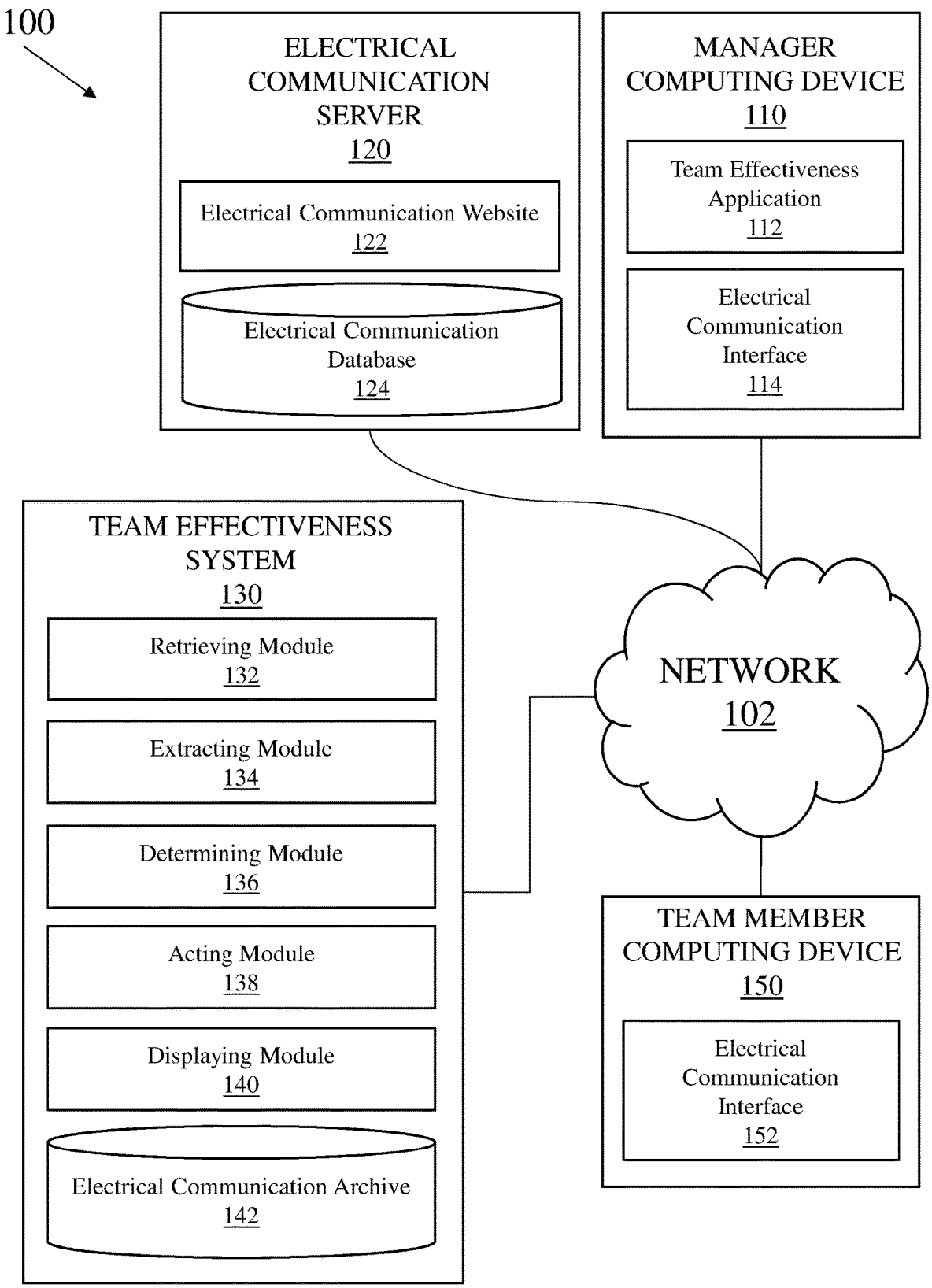
FIG. 1 illustrates a team effectiveness computing environment, in accordance with an embodiment of the present invention.

FIG. 1 illustrates team effectiveness computing environment 100, in accordance with an embodiment of the present invention. Team effectiveness computing environment 100 includes manager computing device 110, electrical communication server 120, team effectiveness system 130, and team member computing device 150 all connected via network 102. The setup in FIG. 1 represents an example embodiment configuration for the present invention and is not limited to the depicted setup in order to derive benefit from the present invention.

With reference to FIG. 1, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® (Bluetooth is a registered trademark of Bluetooth Special Interest Group, Inc.) network, a WiFi network, or a combination thereof. In general, network 102 can be any combination of connections and protocols that will support communications between manager computing device 110, electrical communication server 120, team effectiveness system 130, and team member computing device 150.

With continued reference to FIG. 1, manager computing device 110 includes team effectiveness application 112 and electrical communication interface 114. Manager computing device 110 may be a laptop computer, tablet computer, netbook computer, personal computer (PC), a desktop computer, a personal digital assistant (PDA), a smart phone, or any programmable electronic device capable of communicating with electrical communication server 120, team effectiveness system 130, and team member computing device 150 via network 102. Manager computing device 110 may include internal and external hardware components, as depicted and described in further detail below with reference to FIG. 3. In other embodiments, manager computing device 110 may be implemented in a cloud computing environment, as described in relation to FIGS. 4 and 5, herein. Manager computing device 110 may also have wireless connectivity capabilities allowing manager computing device 110 to communicate with electrical communication server 120, team effectiveness system 130, team member computing device 150, other devices, and other servers over network 102.

In exemplary embodiments, team effectiveness application 112 may be a web browser, computer application, other computer programs or devices on manager computing device 110 that is capable of accessing team effectiveness platforms (e.g., team effectiveness system 130) for the purpose of configuring, displaying, scheduling, acting, and so forth. Team effectiveness application 112, in exemplary embodiments, is capable of configuring team member roster, configuring team specific words, selecting electronic communication platforms, configuring action plans, displaying a report on team analysis information, displaying a report on actions that a team can perform to improve efficiency, scheduling a report time on manager computing device 110. Team effectiveness application 112 may include access to a database of electronic communications from an electronical communication server, such as electrical communication server 120. Team effectiveness application 112 may include access to an authorized team member's computing device, such as team member computing device 150. Team effectiveness report application 112 may store generated team effectiveness reports locally on manager computing device 110. Team effectiveness system 130 may access and/or store the locally stored team effectiveness reports on manager computing device 110.

In exemplary embodiments, manager computing device 110 includes electrical communication interface 114, which may be a computer program that allows a user to interact with manager computing device 110 and other connected servers, such as electrical communication server 120, or devices, such as team member computing device 150, via network 102. For example, electrical communication interface 114 may be a graphical user interface (GUI). In addition to comprising a computer program, electrical communication interface 114 may be connectively coupled to hardware components, such as those depicted in FIG. 3, for receiving user input. In an exemplary embodiment, electrical communication interface 114 is a web browser, however in other embodiments electrical communication interface 114 may be a different program capable of transmitting and/or receiving messages and other forms of communication with other devices, such as team member computing device 150.

With continued reference to FIG. 1, team member computing device 150 includes electrical communication interface 152. Team member computing device 150 may be a laptop computer, tablet computer, netbook computer, personal computer (PC), a desktop computer, a personal digital assistant (PDA), a smart phone, or any programmable electronic device capable of communicating with manager computing device 110, electrical communication server 120, and team effectiveness system 130 via network 102. Team member computing device 150 may include internal and external hardware components, as depicted and described in further detail below with reference to FIG. 3. In other embodiments, team member computing device 150 may be implemented in a cloud computing environment, as described in relation to FIGS. 4 and 5, herein. Team member computing device 150 may also have wireless connectivity capabilities allowing team member computing device 150 to communicate with manager computing device 110, electrical communication server 120, team effectiveness system 130, and other devices or servers over network 102.

In an exemplary embodiment, team member computing device 150 includes electrical communication interface 152, which may be a computer program that allows a user to interact with team member computing device 150 and other connected servers, such as electrical communication server 120, or devices, such as team member computing device 150, via network 102. For example, electrical communication interface 152 may be a graphical user interface (GUI). In addition to comprising a computer program, electrical communication interface 152 may be connectively coupled to hardware components, such as those depicted in FIG. 3, for receiving user input. In an exemplary embodiment, electrical communication interface 152 is a web browser, however in other embodiments electrical communication interface 152 may be a different program capable of transmitting and/or receiving messages and other forms of communication with other devices, such as manager computing device 110.

With continued reference to FIG. 1, electrical communication server 120 includes electrical communication website 122 and electrical communication database 124. In various embodiments, electrical communication server 120 may be a laptop computer, tablet computer, netbook computer, personal computer (PC), a desktop computer, a personal digital assistant (PDA), a smart phone, or any programmable electronic device capable of communicating with manager computing device 110, team effectiveness system 130, and team member computing device 150 via network 102. While electrical communication server 120 is shown as a single device, in other embodiments, electrical communication server 120 may be comprised of a cluster or plurality of computing devices, working together or working separately.

In exemplary embodiments, electrical communication website 122 may be a website capable of hosting electrical communication content shared between registered users, including user identifiers (e.g., names, email address) and messages. For example, electrical communication website 122 is capable of transmitting and receiving manually inserted user message of a user, to a second user and/or other multiple users, to whom the message is directed.

In exemplary embodiments, electrical communication website 122 is accessed via an internet browser, such as electrical communication interface 114 on manager computing device 110 and electrical communication interface 152 on team member computing device 150. In other embodiments, electrical communication website 122 may be accessed via other means known to one of ordinary skill in the art or may be a standalone program.

In exemplary embodiments, electrical communication database 124 may store titles of messages, content of messages, identified sender and receiver(s) of messages, date and time when messages were sent, categories of messages, or any other category or information known to one of ordinary skill in the art. Electrical communication database 124 is capable of being dynamically updated. In exemplary embodiments, users provide consent and are provided with full disclosure before any user data is tracked, stored, and/or transmitted. Users can opt-in or opt-out of sharing user data at any time.

In exemplary embodiments, electrical communication database 124 may store information, for example, as a data object with the following information: title of a message (e.g., RE:URGENT Search Report Needed), content of the message (e.g., Please proceed to provide a search report as soon as possible), who sent the message (e.g., John Smith), when the message was sent (e.g., 07/09/19/02/00/PM/EDT), who received the message (e.g., John Doe, Paul Smith, Josh Lee), categories of messages (e.g., urgent). As such, the user data object, in this case, may be stored in electrical communication database 124 as <RE:URGENT Search Report Needed; Please proceed to provide a search report as soon as possible; John Smith; 07/09/19/02/00/PM/EDT; John Doe, Paul Smith, Josh Lee; urgent>.

In various embodiments, electrical communication database 124 is capable of being stored on manager computing device 110, team effectiveness system 130, team member computing device 150, any other server, or any other device connected to network 102, as a separate database.

With continued reference to FIG. 1, team effectiveness system 130 includes electrical communication archive 142 and may be a computer program that includes instruction sets, executable by a processor. The instruction sets may be described using a set of functional modules. Team effectiveness system 130 receives input from manager computing device 110, electrical communication server 120, and team member computing device 150. In alternative embodiments, team effectiveness system 130 may be a computer application on a separate electronic device, such as manager computing device 110, or a separate server, such as electrical communication server 120.

In exemplary embodiments, electrical communication archive 142 may store title of messages, content of messages, who sent such messages, when messages were sent, who received messages, categories of messages, number of messages sent in a period of time, team analysis report, team analysis graph, or any other category or information known to one of ordinary skill in the art. Electrical communication archive 142 is capable of being dynamically updated. In exemplary embodiments, users provide consent and are provided with full disclosure before any user data is tracked, stored, and/or transmitted. Users can opt-in or opt-out of sharing user data at any time.

With continued reference to FIG. 1, the functional modules of team effectiveness system 130 include retrieving module 132, extracting module 134, determining module 136, acting module 138, and displaying module 140.

Figure 2:
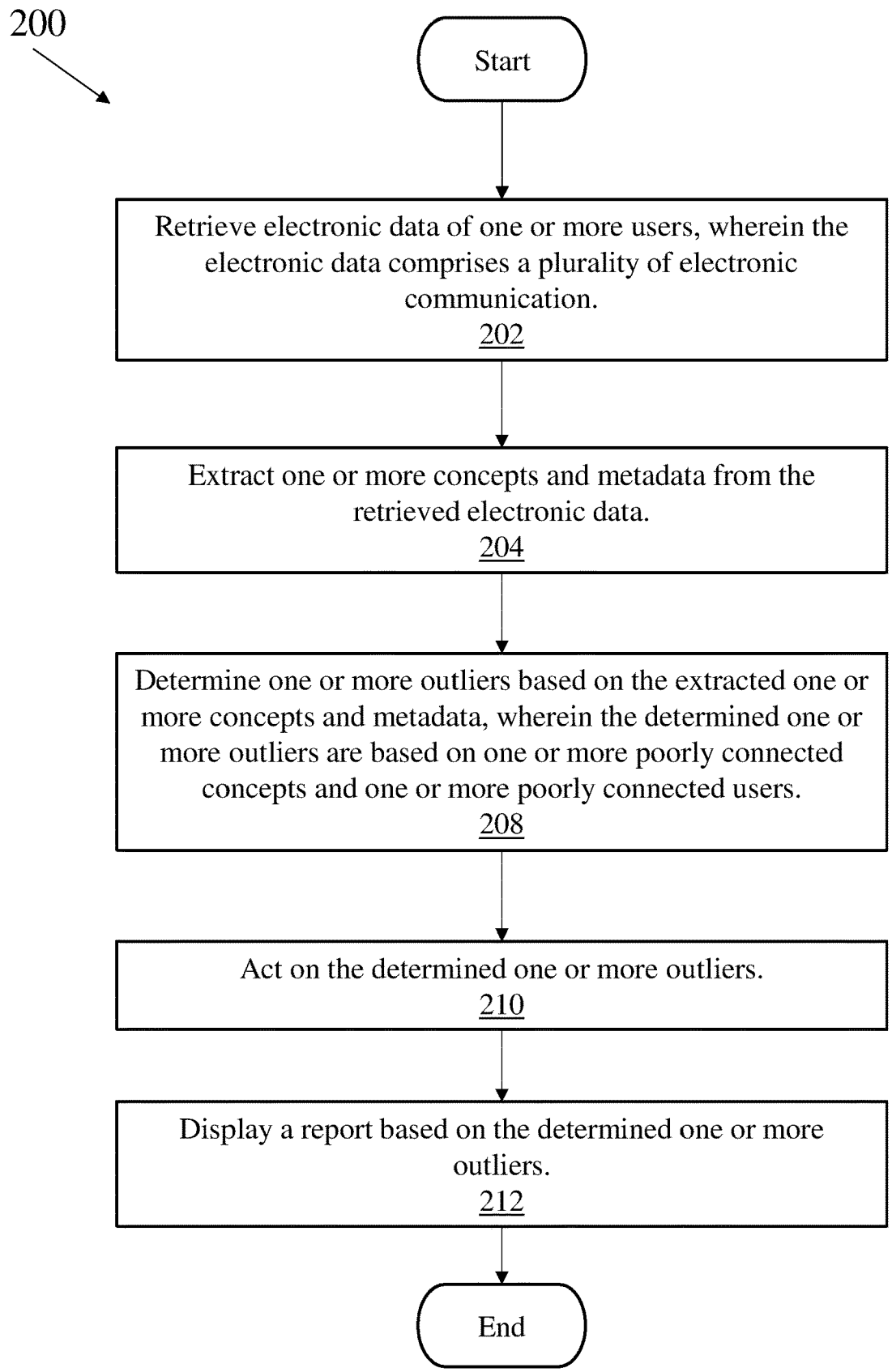
FIG. 2 is a flowchart illustrating the operation of a team effectiveness system of FIG. 1, in accordance with an embodiment of the present invention.

FIG. 2 illustrates team effectiveness system flowchart 200 that represents the operation of team effectiveness system 130 of FIG. 1, in accordance with embodiments of the present invention.

With reference to FIGS. 1 and 2, retrieving module 132 includes a set of programming instructions, in team effectiveness system 130, to retrieve electronic data of one or more users, wherein the electronic data comprises a plurality of electronic communications (step 202). The set of programming instructions is executable by a processor.

In exemplary embodiments, one or more users may include team members and a manager of such team. The team manager may configure a list of team members, a list of multiple communication electrical communication servers (e.g., electrical communication server 120), a time period (e.g., any communications in last 30 days), or any other category or information known to one of ordinary skill in the art via team effectiveness application (e.g., team effectiveness application 112). For example, the team manager configures, on the team effectiveness application 112, that the team members are John, Mike, and Paul. Moreover, the team manager may configure team effectiveness application 112 to retrieve messages within the last 30 days and to include messages from the team's company email platform, and the team's company internal messenger platform. Retrieving module 132 may then retrieve electronic data, from the company email platform and the company's internal messenger platform, for each member of the team.

In exemplary embodiments, retrieving module 132 retrieves electronic data that may include content of messages, metadata of each message (e.g., when a message was sent, user-selected message importance level, etc.), organization identifier, team name, or any other category or information known to one of ordinary skill in the art. The retrieved electronic data is transferred to team effectiveness system 130.

In alternative embodiments, retrieving module 132 may further include a minimum value requirement to retrieve electronic data of one or more users. Minimum value may be a pre-configured value or a user-configured value via team effectiveness application (e.g., team effectiveness application 112). Minimum value requirement may be a minimum number of messages required for retrieving module 132 to retrieve electronic data of one or more users. Minimum value requirement may be helpful to eliminate inaccurate team analysis. For example, retrieving module 132 may not retrieve electronic data unless there are more than 20 messages exchanged between team members.

With reference to an illustrative example, Fred, a team manager, has configured a team roster to include Judy, Barney, Alice, George, and Wilma via team effectiveness application 112. Fred further configures team effectiveness application 112 to retrieve messages from the company's email.

With continued reference to FIGS. 1 and 2, extracting module 134 includes a set of programming instructions, in team effectiveness system 130, to extract one or more concepts and metadata from the retrieved electronic data (step 204). The set of programming instructions is executable by a processor.

In exemplary embodiments, extracting module 134 may extract one or more concepts and metadata from the retrieved electronic data where one or more concepts and metadata may include extracting at least one of the following: person reference nodes, sender identifiers, concept reference nodes, metadata weights, and conversation identifiers.

In exemplary embodiments, person references nodes may include references to person identifiers (e.g., names and/or identifier—e.g., email address, nickname—under "To section," "Carbon Copy ("CC") section," "Blind Carbon Copy ("BCC") section," and textual references within the retrieved messages from the electrical communication). For example, John sent an email and listed Mike under "To section," and listed James and Paul under "CC section." Then, extracting module 134 will label person references of such messages to be "Mike; James, Paul."

In exemplary embodiments, concept reference nodes may include message content within the body section and the subject section within the retrieved electronic data. For example, if the title of the retrieved message states, "Patent Project: A0001, Search Report Needed," then extracting module 134 may specify concept reference node of such messages to be "A0001 Search Report."

In exemplary embodiments, conversation identifiers may include conversation ID (e.g., message hash code identifier) and thread ID (e.g., email chain hash code identifier). For example, for an email chain that includes five messages, extracting module 134 may label all five messages with a same thread ID (e.g., B0001), and may label each message with a unique conversation ID (e.g., C0001; C0002; C0003; C0004; C0005).

In exemplary embodiments, metadata weights may be a value of each message based on its relevancy. Metadata weight may be helpful to determine which team member was not involved in communicating relevant messages because information included in a relevant message may be helpful to achieve the team's goal.

In exemplary embodiments, relevancy may be determined based on a user selected priority level. For example, John sent an email to Mike and James, and labeled the email as "Critical." Extracting module 134 would give such message a higher metadata weight compared to an email labeled as "Normal."

In exemplary embodiments, extracting module 134 is further capable of eliminating duplicate electronic data from the retrieved electronic data, ignoring forwarded or replied to messages, scoring the retrieved electronic data, and summarizing the one or more concepts from the retrieved electronic data.

In exemplary embodiments, scoring the retrieved electronic data may include scoring based on reply-marks (i.e., whether a user replied to a message), read-marks (i.e., whether a user read a message), gaze-data (i.e., how long a user engaged with the message, wherein score increases when user engagement value (e.g., how long a user looked at a computer screen determined based on captured images from a camera) increases), and whether an electronic message includes a manager configured list of words and/or pre-configured list of words. This scoring process may be helpful to determine which users did not receive certain communications. For example, a team may be comprised of members "A," "B," and "C." Team member "A" sent a message to "B" with a message titled, "URGENT. IMPORTANT. Search Report on Patent Needed." Extracting module 134 scores the message as 8 out of 10 under relevance factor because the message contains one or more words from the pre-configured list of words (i.e., urgent, important, needed) and one or more words from the manager configured list of words (i.e., search report, and patent).

In alternative embodiments, scoring the retrieved electronic data may further consider emotional factors. Emotional factors may be a pre-configured, user-configured list of words via team effectiveness application (e.g., team effectiveness application 112), a natural language processing device or a program to evaluate the content of the messages (e.g., whether the writer of the message is angry, anxious, happy, etc.), or via other means known to one of ordinary skill in the art. For example, if the content of the message says "Congratulations," extracting module 134 may consider the message to be positive.

In exemplary embodiments, summarizing the one or more concepts from the retrieved electronic data may include extracting a main topic (i.e., concept) of each message and shortening the retrieved electronic data to an identifier. For example, A message titled "Platform health," may be summarized as "Platform."

In alternative embodiments, extracting module 134 may further include a diversity spread value requirement. Diversity spread value may be a pre-configured value or a user-configured value via team effectiveness application (e.g., team effectiveness application 112). Diversity spread value requirement may be a minimum extracted number of concepts required to execute programming instructions, such as determining module 136. Diversity spread value requirement may be helpful to eliminate inaccurate team analysis. For example, extracting module 134 may require that more than 20 concepts to be discussed amongst the team to execute programming instructions, such as determining module 136.

With continued reference to the illustrative example above, extracting module 134 extracts two concepts (i.e., platform and patent) from the team member's email correspondence. Moreover, extracting module 134 extracts metadata from Fred and Barney's email correspondence wherein they discussed "platform." Extracting module 134 extracts metadata from Judy, Barney, Alice, and Wilma's email correspondence wherein they discussed "patents." No other email exchanges occurred amongst the team members.

In exemplary embodiments, team effectiveness system 130 may build a relationship based on the extracted one or more concepts and metadata.

In exemplary embodiments, the built relationship may be depicted as a graph, wherein the built graph comprises a multiple set of nodes and a plurality of edges.

In exemplary embodiments, team effectiveness system 130 is further capable of representing the built relationships, wherein a first set of nodes, of the multiple set of nodes, represents each of the summarized one or more concepts, and wherein a second set of nodes, of the multiple set of nodes, represents the one or more users, and wherein each edge, of the plurality of edges, represents participation with each of the extracted one or more concepts and metadata, by each of the one or more users.

In exemplary embodiments, team effectiveness system 130 is further capable of calculating a corresponding customized weight for each of the plurality of edges based on participation value by each of the one or more users.

In exemplary embodiments, participation value may be calculated based on authorship, readership, metadata weight, or any other category or information known to one of ordinary skill in the art. For example, if John exchanged 50 messages about the "concept-1" and if John only exchanged 20 messages about the "concept-2," then the participation value between John and "concept-1" will be greater compared to the participate value between John and "concept-2." John and "concept-1" participation value is greater because John exchanged more messages about "concept-1" compared with the number of messages exchanged about "concept-2." Moreover, other factors may contribute to the greater participation value of "concept-1" than "concept-2." Such factors may include the fact that John received more emails from his team manager about the "concept-1," John received more emails from his customers about the "concept-1," John wrote more emails about the "concept-1," and that John received and transmitted more emails within the last ten days.

In alternative embodiments, team effectiveness system 130 is further capable of building a graphical user interface (GUI) that may include the built graph. team effectiveness system 130 may adjust a thickness of each of the plurality of edges based on the corresponding calculated customized weight value for each of the plurality of edges. For example, if the calculated customized weight value between John and "concept-1" is greater than the calculated customized weight value between John and "concept-2," Team effectiveness system 130 may make the edge between John and "concept-1" thicker than the edge between John and "concept-2."

In alternative embodiments, team effectiveness system 130 is further capable of building a pseudo coordinate graph. A pseudo coordinate graph may be a graph based on the extracted one or more concepts, metadata, and multiple team indicators. The built graph, on the other hand, comprises a multiple set of nodes, a plurality of edges, and a coordinate representing each team identifier. For example, if the manager manages two teams in New York and two teams in Los Angeles, team effectiveness system 130 may build a graph that is represented in a coordinate system based on the team's location (e.g., New York, and Los Angeles), and team identifier (e.g., "A," "B," "C," and "D"). Within each represented coordinate, team effectiveness system 130 may build a graph comprising multiple sets of nodes and multiple edges.

In alternative embodiments, team effectiveness system 130 is further capable of building a data object based on the extracted one or more concepts and metadata. For example, a data object may comprise user identifiers (e.g., John, Paul), extracted concepts (e.g., concept-1, concept-2), or any other category or information known to one of ordinary skill in the art. As such, the built data object, in this case, may be stored locally on a device (e.g., manager computing device 110), or on a database (e.g., electrical communication archive 142). Data object may be stored as <John, James, Jim, Paul; concept-1, concept-2, computer>. Stored data object is capable of being dynamically updated.

For example, team effectiveness system 130 builds a graph. Team effectiveness system 130 builds two circles (e.g., one for each summarized concept), labeled as "platform" and "patent." Team effectiveness system 130 further builds six rectangles (e.g., one for each team named team member), labeled as Fred, Judy, Barney, Alice, George, and Wilma. Team effectiveness system 130 builds two arrows—i.e., first, between Fred and "platform"; second, between Barney and "platform"—because Judy, Alice, George, and Wilma did not exchange messages about "platform." Team effectiveness system 130 further builds four arrows—i.e., first, between Judy and "patent"; second, between Barney and "patent"; third, between Alice and "patent"; fourth, between Wilma and "patent"—because Fred and George did not exchange messages about patent.

With continued reference to FIGS. 1 and 2, determining module 136 includes a set of programming instructions, in team effectiveness system 130, to determine one or more outliers based on the extracted one or more concepts and metadata, wherein the determined one or more outliers are based on one or more poorly connected concepts and one or more poorly connected users (step 208). The set of programming instructions is executable by a processor.

In exemplary embodiments, determining module 136 is capable of determining whether each of the one or more users are poorly connected to the summarized one or more concepts, based on the corresponding calculated customized weight value being below a threshold value, and determining whether each of the one or more summarized concepts are poorly connected to each of the one or more users, based on the corresponding calculated customized weight value being below a threshold value.

With continued reference to the illustrative example above, determining module 136 determines that George is a poorly connected user because George did not exchange messages about both concepts, "platform" and "patent." Determining module 136 further determines that the concept "platform" is a poorly connected concept because only two members exchanged messages about the concept "platform." Determining module 136 further concludes that the outliers are George and "platform."

With continued reference to FIGS. 1 and 2, acting module 138 includes a set of programming instructions, in team effectiveness system 130, to act on the determined one or more outliers (step 210). The set of programming instructions is executable by a processor.

In exemplary embodiments, acting module 138 performs one or more configured or one or more pre-configured actions on the determined one or more outliers.

In exemplary embodiments, list of actions may include creating one or more electronic forums for the one or more users to discuss each of the one or more poorly connected concepts and each of the one or more poorly connected users, pre-populating the one or more poorly connected concepts and the one or more poorly connected users via data referencing within the one or more electronic forums.

In exemplary embodiments, list of actions may further include recommending training to the manager based on each of the labeled one or more outliers and one or more poorly connected concepts, requesting an approval from the manager before message to the labeled one or more outliers or message on the labeled one or more poorly connected concept gets sent, excluding the disapproved one or more messages from the inboxes of each of the one or more members of the team, organizing inboxes of each of the labeled outliers and determining a schedule when the disapproved one or more messages will be sent to each of the one or more members of the team.

With continued reference to the illustrative example above, acting module 138 recommends that Fred not discuss the concept "platform" on company email and, rather, acting module 138 creates an electronic forum channel to discuss George's non-participation, and acting module 138 may prepopulate a message to other team members advising to include George on future team emails about the concept "patent."

With continued reference to FIGS. 1 and 2, displaying module 140 includes a set of programming instructions, in team effectiveness system 130, to display a report based on the determined one or more outliers (step 212). The set of programming instructions is executable by a processor.

In exemplary embodiments, displaying module 140 may display a report via team effectiveness application (e.g., team effectiveness application 112) or may display a report on a user-selected electrical communication platform (e.g., email) based on a user-selected schedule configured via team effectiveness application (e.g., team effectiveness application 112).

In exemplary embodiments, the displayed report may include a list of team members, how many messages were retrieved and analyzed, which team members were outliers, which concepts were outliers, a list of pre-configured and user-configured actions, or any other category or information known to one of ordinary skill in the art.

In alternative embodiments, displaying module 140 may further display a screenshot of the built graph and/or the built pseudo coordinate graph.

With continued reference to the illustrative example above, displaying module 140 displays a report on Fred's computing device, such as manager computing device 110, based on Fred's configured preferred schedule. The report includes team roster, list of outliers, list of actions performed, and further actions Fred can perform to overcome analyzed outliers.

Figure 3:
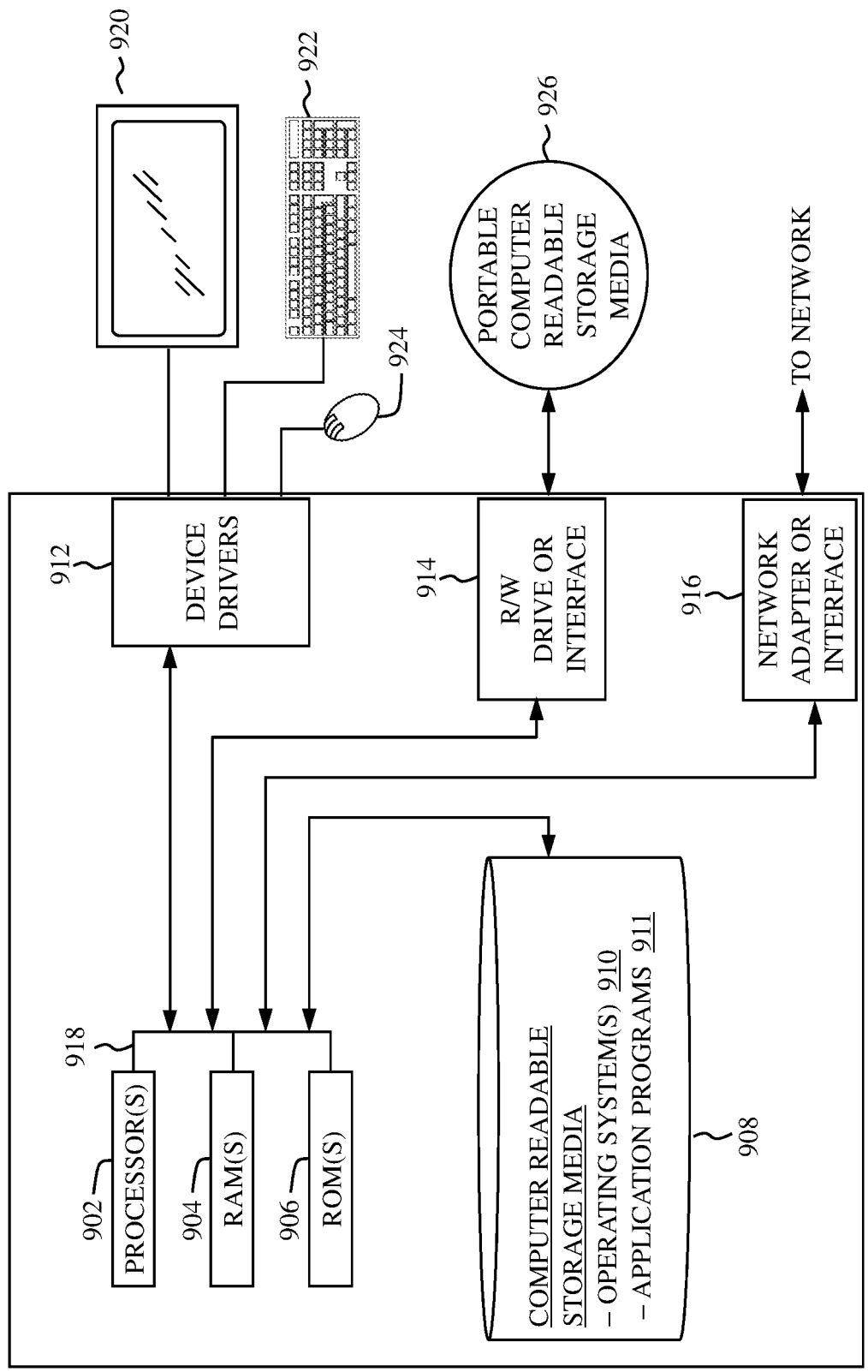
FIG. 3 is a diagram graphically illustrating the hardware components of the team effectiveness computing environment of FIG. 1, in accordance with an embodiment of the present invention.

FIG. 3 is a block diagram depicting components of a computing device (such as manager computing device 110, electrical communication server 120, team effectiveness system 130, or team member computing device 150 as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as team effectiveness system 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on the computing device may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on the computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this invention disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
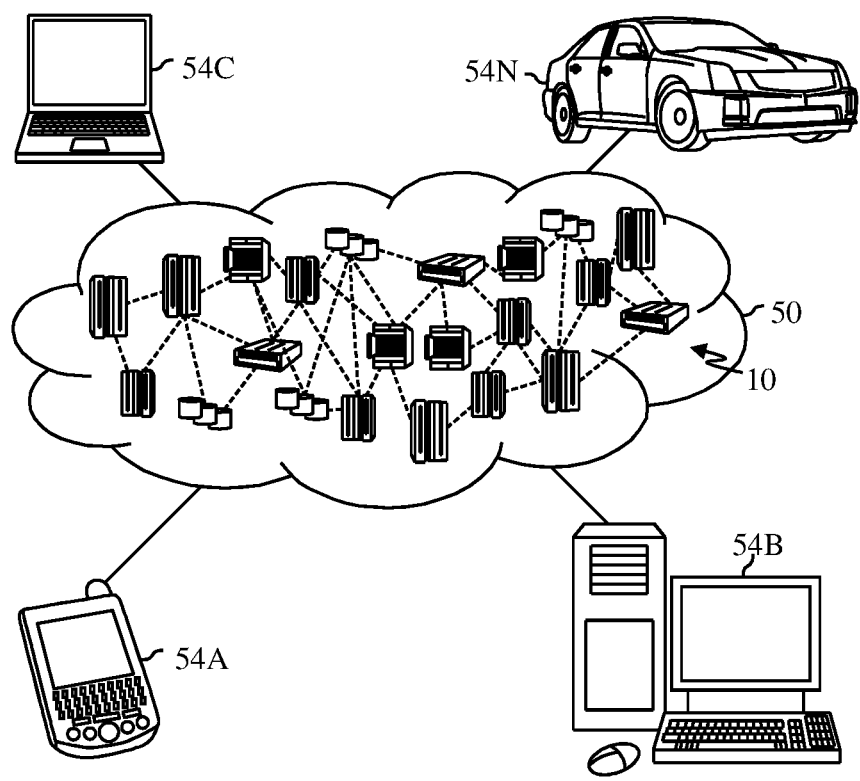
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
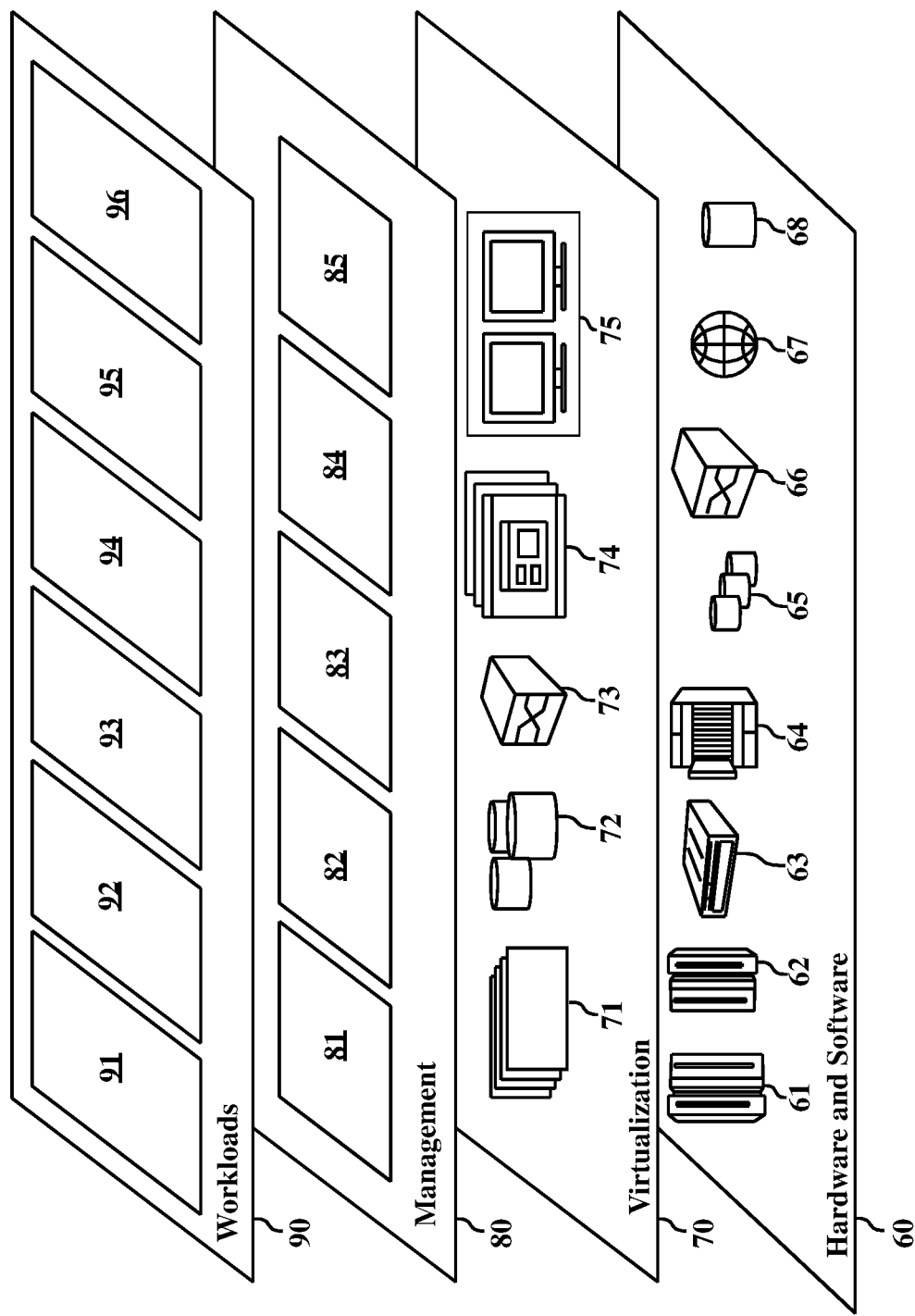
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method comprising:
retrieving electronic data of one or more users, wherein the electronic data comprises a plurality of electronic communications;
extracting one or more concepts and metadata from the retrieved electronic data;
building a relationship graph based on the extracted one or more concepts and metadata, wherein the built relationship graph comprises multiple sets of nodes and a plurality of edges, wherein a first set of nodes, of the multiple sets of nodes, represents each of the one or more concepts, wherein a second set of nodes, of the multiple set of nodes, represents the one or more users, and wherein each edge, of the plurality of edges, represents participation with each of the one or more concepts and metadata, by each of the one or more users;
building a graphical user interface (GUI) to display the built relationship graph;
determining one or more outliers based on the extracted one or more concepts and metadata, wherein the determined one or more outliers are based on one or more poorly connected concepts and one or more poorly connected users;
acting on the determined one or more outliers by:
creating one or more electronic forums for the one or more users to discuss each of the one or more poorly connected concepts and each of the one or more poorly connected users; and
pre-populating the one or more poorly connected concepts and the one or more poorly connected users via data referencing within the one or more electronic forums; and
displaying a report based on the determined one or more outliers.

2. The computer-implemented method of claim 1, wherein extracting one or more concepts and metadata from the retrieved electronic data further comprises:
eliminating duplicate electronic data from the retrieved electronic data;
scoring the retrieved electronic data; and
summarizing the one or more concepts from the retrieved electronic data.

3. The computer-implemented method of claim 1, wherein extracting one or more concepts and metadata for each user from the retrieved electronic data further comprises:
extracting at least one of the following from a group consisting of: person reference nodes, sender identifiers, concept reference nodes, metadata weights, and conversation identifiers.

4. The computer-implemented method of claim 2, further comprising:
calculating a corresponding customized weight for each of the plurality of edges based on a participation value by each of the one or more users, wherein the participation value indicates a particular user's level of participation with respect to a particular topic/concept; and
adjusting a thickness of each of the plurality of edges based on the corresponding calculated customized weight value for each of the plurality of edges.

5. The computer-implemented method of claim 4, further comprising:
determining whether each of the one or more users are poorly connected to the summarized one or more concepts, based on the calculated corresponding customized weight value being below a threshold value; and
determining whether each of the one or more summarized concepts are poorly connected to each of the one or more users, based on the calculated corresponding customized weight value being below the threshold value.

6. A computer program product for implementing a program that manages a device, the computer program product comprising a computer readable storage medium having program instructions embodied therewith, the program instruction executable by a processor of a computer to perform a method, the method comprising:
retrieving electronic data of one or more users, wherein the electronic data comprises a plurality of electronic communications;
extracting one or more concepts and metadata from the retrieved electronic data;
building a relationship graph based on the extracted one or more concepts and metadata, wherein the built relationship graph comprises multiple sets of nodes and a plurality of edges, wherein a first set of nodes, of the multiple sets of nodes, represents each of the one or more concepts, wherein a second set of nodes, of the multiple set of nodes, represents the one or more users, and wherein each edge, of the plurality of edges, represents participation with each of the one or more concepts and metadata, by each of the one or more users;
building a graphical user interface (GUI) to display the built relationship graph;
adjusting a thickness of each of the plurality of edges based the user's participation for each of the one or more users;
determining one or more outliers based on the extracted one or more concepts and metadata, wherein the determined one or more outliers are based on one or more poorly connected concepts and one or more poorly connected users;
acting on the determined one or more outliers by recommending training to a manager based on each of the determined one or more outliers and one or more poorly connected concepts, requesting an approval from the manager before a message to the determined one or more outliers or a message on the determined one or more poorly connected concepts is sent, excluding disapproved messages from inboxes of each of the one or more users, organizing inboxes of each of the determined outliers and determining a schedule when the disapproved one or more messages will be sent to each of the one or more users; and displaying a report based on the determined one or more outliers.

7. The computer program product of claim 6, wherein extracting one or more concepts and metadata from the retrieved electronic data further comprises:

eliminating duplicate electronic data from the retrieved electronic data;

scoring the retrieved electronic data; and summarizing the one or more concepts from the retrieved electronic data.

8. The computer program product of claim 6, wherein extracting one or more concepts and metadata for each user from the retrieved electronic data further comprises:

extracting at least one of the following from a group consisting of: person reference nodes, sender identifiers, concept reference nodes, metadata weights, and conversation identifiers.

9. The computer program product of claim 7, further comprising:

calculating a corresponding customized weight for each of the plurality of edges based on a participation value by each of the one or more users, wherein the participation value indicates a particular user's level of participation with respect to a particular topic/concept; and adjusting a thickness of each of the plurality of edges based on the corresponding calculated customized weight value for each of the plurality of edges.

10. The computer program product of claim 9, further comprising:

determining whether each of the one or more users are poorly connected to the summarized one or more concepts, based on the calculated corresponding customized weight value being below a threshold value; and determining whether each of the one or more summarized concepts are poorly connected to each of the one or more users, based on the calculated corresponding customized weight value being below the threshold value.

11. A computer system comprising:

retrieving electronic data of one or more users, wherein the electronic data comprises a plurality of electronic communications;

extracting one or more concepts and metadata from the retrieved electronic data;

building a relationship graph based on the extracted one or more concepts and metadata, wherein the built relationship graph comprises multiple sets of nodes and a plurality of edges, wherein a first set of nodes, of the multiple sets of nodes, represents each of the one or more concepts, wherein a second set of nodes, of the multiple set of nodes, represents the one or more users, wherein each of the second set of nodes being annotated with one of at least two team indicators identifying a geographic location of the user's team, and wherein each edge, of the plurality of edges, represents participation with each of the one or more concepts and metadata, by each of the one or more users;

building a graphical user interface (GUI) to display the built relationship graph;

building a coordinate graph based on the extracted one or more concepts, metadata, and the at least two team indicators, wherein the built coordinate graph comprises the multiple sets of nodes and a plurality of edges of the built relationship graph arranged by each geographic location based on the two or more team identifiers;

adjusting a thickness of each of the plurality of edges based the user's participation for each of the one or more users;

determining one or more outliers based on the extracted one or more concepts and metadata, wherein the determined one or more outliers are based on one or more poorly connected concepts and one or more poorly connected users;

acting on the determined one or more outliers; and displaying a report based on the determined one or more outliers the displayed report includes a list of the one or more users, how many messages retrieved and analyzed, which of the one or more users were determined to be included in the one or more outliers, which concepts were determined to be included in the one or more outliers, and a list of pre-configured actions and user-configured actions.

12. The computer system of claim 11, wherein extracting one or more concepts and metadata from the retrieved electronic data further comprises:

eliminating duplicate electronic data from the retrieved electronic data;

scoring the retrieved electronic data; and summarizing the one or more concepts from the retrieved electronic data.

13. The computer system of claim 11, wherein extracting one or more concepts and metadata for each user from the retrieved electronic data further comprises:

extracting at least one of the following from a group consisting of: person reference nodes, sender identifiers, concept reference nodes, metadata weights, and conversation identifiers.

14. The computer system of claim 12, further comprising:

calculating a corresponding customized weight for each of the plurality of edges based on a participation value by each of the one or more users, wherein the participation value indicates a particular user's level of participation with respect to a particular topic/concept; and adjusting a thickness of each of the plurality of edges based on the corresponding calculated customized weight value for each of the plurality of edges.

15. The computer system of claim 14, further comprising:

determining whether each of the one or more users are poorly connected to the summarized one or more concepts, based on the calculated corresponding customized weight value being below a threshold value; and determining whether each of the one or more summarized concepts are poorly connected to each of the one or more users, based on the calculated corresponding customized weight value being below the threshold value.

* * * * *